United States Patent
Olenick et al.

(10) Patent No.: US 9,805,114 B2
(45) Date of Patent: Oct. 31, 2017

(54) COMPOSABLE SELECTION MODEL THROUGH REUSABLE COMPONENT

(71) Applicant: Microsoft Technology Licensing, LLC, Redmond, WA (US)

(72) Inventors: Brad Olenick, Redmond, WA (US); Federico Silva Armas, Seattle, WA (US); Steven Sanderson, Bristol (GB); Alvaro Rahul Dias, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 14/231,897

(22) Filed: Apr. 1, 2014

(65) Prior Publication Data

US 2015/0095851 A1    Apr. 2, 2015

Related U.S. Application Data

(60) Provisional application No. 61/905,128, filed on Nov. 15, 2013, provisional application No. 61/884,743, (Continued)

(51) Int. Cl.
*G06F 3/048*    (2013.01)
*G06F 17/30*    (2006.01)
(Continued)

(52) U.S. Cl.
CPC ...... *G06F 17/30654* (2013.01); *G06F 3/0481* (2013.01); *G06F 3/0482* (2013.01);
(Continued)

(58) Field of Classification Search
CPC .. G06F 3/0481; G06F 3/04842; G06F 3/0482; G06F 3/04817
See application file for complete search history.

(56) References Cited

U.S. PATENT DOCUMENTS 5,625,763 A    4/1997  Cirne
5,845,299 A    12/1998 Arora et al.
(Continued)

FOREIGN PATENT DOCUMENTS

EP    1615118    1/2006
WO    WO 02097601 A2    12/2002

OTHER PUBLICATIONS

"International Search Report and Written Opinion Received for PCT Patent Application No. PCT/US2014/057323", dated Dec. 10, 2014, 8 pages.

(Continued)

*Primary Examiner* — Nicholas Augustine
(74) *Attorney, Agent, or Firm* — Workman Nydegger

(57) ABSTRACT

A selection component that facilitates selection of user interface items. Upon receiving a user interface item identification from a data model component, the selection component determines a selection state of the identified user interface item using maintained selection state. The selection component then propagates the selection state in two directions. In one direction, the selection component notifies the identified user interface item of the selection state so that the user interface item may visualize its selection state. In the other direction, the selection component notifies an action module of the selection state of the user interface item so that the action module may take further action external to the user interface item based on the selection state. For instance, the action module might create a new user interface element.

20 Claims, 6 Drawing Sheets

Related U.S. Application Data filed on Sep. 30, 2013, provisional application No. 61/905,111, filed on Nov. 15, 2013, provisional application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.
| | | |
|---|---|---|
| *G06F 9/44* | (2006.01) | |
| *G06F 3/0484* | (2013.01) | |
| *G06F 17/21* | (2006.01) | |
| *G06F 3/0481* | (2013.01) | |
| *G06F 3/0482* | (2013.01) | |
| *G06F 3/0485* | (2013.01) | |
| *G06F 3/0488* | (2013.01) | |
| *G06F 9/48* | (2006.01) | |
| *G06F 3/01* | (2006.01) | |

(52) U.S. Cl.
CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(56) References Cited

U.S. PATENT DOCUMENTS

| | | | |
|---|---|---|---|
| 5,886,694 | A | 3/1999 | Breinberg et al. |
| 6,049,812 | A | 4/2000 | Bertram et al. |
| 6,460,060 | B1 | 10/2002 | Maddalozzo et al. |
| 6,473,891 | B1 | 10/2002 | Shively |
| 6,750,887 | B1 | 6/2004 | Kellerman et al. |
| 6,919,890 | B2 | 7/2005 | Halstead, Jr. |
| 6,944,829 | B2 | 9/2005 | Dando |
| 6,950,198 | B1* | 9/2005 | Berarducci ........ G06Q 30/0601 358/1.12 |
| 6,950,993 | B2 | 9/2005 | Breinberg |
| 7,062,475 | B1 | 6/2006 | Szabo et al. |
| 7,243,335 | B1 | 7/2007 | Andrew |
| 7,340,721 | B1 | 3/2008 | Bailey |
| 7,401,289 | B2 | 7/2008 | Lachhwani et al. |
| 7,417,644 | B2 | 8/2008 | Cooper et al. |
| 7,536,672 | B1 | 5/2009 | Ruehle |
| 7,577,938 | B2 | 8/2009 | Bent et al. |
| 7,624,342 | B2 | 11/2009 | Matveyenko et al. |
| 7,669,140 | B2 | 2/2010 | Matthews et al. |
| 7,730,418 | B2 | 6/2010 | Wang et al. |
| 7,769,794 | B2 | 8/2010 | Moore et al. |
| 7,823,077 | B2 | 10/2010 | Kurtz et al. |
| 7,933,632 | B2 | 4/2011 | Flynt et al. |
| 7,954,064 | B2 | 5/2011 | Forstall et al. |
| 8,095,412 | B1 | 1/2012 | Zias et al. |
| 8,181,156 | B1 | 5/2012 | Bobykin |
| 8,195,646 | B2 | 6/2012 | Evans et al. |
| 8,316,323 | B2 | 11/2012 | Saraiya et al. |
| 8,321,847 | B1 | 11/2012 | Garvin et al. |
| 8,365,138 | B2 | 1/2013 | Iborra et al. |
| 8,453,065 | B2 | 5/2013 | Chaudhrl et al. |
| 8,533,667 | B2 | 9/2013 | Alexander et al. |
| 8,543,824 | B2 | 9/2013 | Louch et al. |
| 8,856,681 | B2 | 10/2014 | Rodden et al. |
| 8,869,027 | B2 | 10/2014 | Louch et al. |
| 8,990,199 | B1 | 3/2015 | Ramesh |
| 9,152,616 | B2 | 10/2015 | Ying et al. |
| 9,195,477 | B1 | 11/2015 | Spencer |
| 9,244,661 | B1 | 1/2016 | Garvin et al. |
| 9,244,971 | B1 | 1/2016 | Kalki |
| 2002/0105658 | A1* | 8/2002 | Jackson ............ G06Q 30/0641 358/1.2 |
| 2002/0138637 | A1 | 9/2002 | Suzuoki et al. |
| 2002/0147963 | A1 | 10/2002 | Lee |
| 2003/0011638 | A1 | 1/2003 | Chung |
| 2003/0058286 | A1 | 3/2003 | Dando |
| 2003/0090504 | A1* | 5/2003 | Brook ............... G06F 17/30843 715/716 |
| 2003/0137540 | A1 | 7/2003 | Klevenz et al. |
| 2003/0210274 | A1 | 11/2003 | Subramanian et al. |
| 2004/0098390 | A1 | 5/2004 | Bayliss et al. |
| 2004/0225581 | A1 | 11/2004 | Wyle et al. |
| 2004/0243576 | A1 | 12/2004 | Shrivastava et al. |
| 2005/0088410 | A1 | 4/2005 | Chaudhri |
| 2005/0125727 | A1 | 6/2005 | Ramachandran et al. |
| 2005/0131889 | A1 | 6/2005 | Bennett et al. |
| 2005/0177586 | A1 | 8/2005 | Chen |
| 2005/0188349 | A1 | 8/2005 | Bent et al. |
| 2006/0048071 | A1 | 3/2006 | Jarrett et al. |
| 2006/0053096 | A1 | 3/2006 | Subramanian et al. |
| 2006/0190833 | A1 | 8/2006 | SanGiovanni et al. |
| 2006/0253799 | A1 | 11/2006 | Montroy |
| 2006/0282771 | A1 | 12/2006 | Vinci |
| 2007/0024646 | A1 | 2/2007 | Saarinen et al. |
| 2007/0027851 | A1 | 2/2007 | Kruy |
| 2007/0033522 | A1 | 2/2007 | Lin et al. |
| 2007/0094326 | A1 | 4/2007 | Gupta |
| 2007/0136579 | A1 | 6/2007 | Levy et al. |
| 2007/0156740 | A1 | 7/2007 | Leland et al. |
| 2007/0162439 | A1 | 7/2007 | Petropoulos et al. |
| 2007/0209023 | A1* | 9/2007 | Nakagawa .......... H04L 67/1078 715/838 |
| 2007/0233854 | A1 | 10/2007 | Bukovec et al. |
| 2007/0234195 | A1 | 10/2007 | Wells |
| 2007/0288667 | A1* | 12/2007 | Kamata ............. G06F 17/3028 710/65 |
| 2008/0065974 | A1 | 3/2008 | Campbell |
| 2008/0066080 | A1 | 3/2008 | Campbell |
| 2008/0109714 | A1 | 5/2008 | Kumar et al. |
| 2008/0109785 | A1 | 5/2008 | Bailey |
| 2008/0144119 | A1* | 6/2008 | Otake ............... H04N 1/00307 358/296 |
| 2008/0177994 | A1 | 7/2008 | Mayer |
| 2008/0201401 | A1 | 8/2008 | Pugh et al. |
| 2008/0235618 | A1 | 9/2008 | Sadouski |
| 2008/0313648 | A1 | 12/2008 | Wang et al. |
| 2008/0320413 | A1 | 12/2008 | Oshiro et al. |
| 2009/0037605 | A1* | 2/2009 | Li ..................... G06Q 20/12 709/246 |
| 2009/0055432 | A1 | 2/2009 | Smith |
| 2009/0106227 | A1 | 4/2009 | Davis |
| 2009/0119257 | A1 | 5/2009 | Waters |
| 2009/0254337 | A1 | 10/2009 | Sprecher et al. |
| 2009/0254822 | A1 | 10/2009 | Greenlee |
| 2009/0292989 | A1 | 11/2009 | Matthews |
| 2009/0319939 | A1 | 12/2009 | Danton et al. |
| 2010/0005053 | A1 | 1/2010 | Estes |
| 2010/0058227 | A1 | 3/2010 | Danton et al. |
| 2010/0115053 | A1 | 5/2010 | Ryu et al. |
| 2010/0174774 | A1 | 7/2010 | Kern et al. |
| 2010/0229115 | A1 | 9/2010 | Augustine et al. |
| 2010/0251143 | A1 | 9/2010 | Thomas et al. |
| 2010/0262905 | A1 | 10/2010 | Li |
| 2010/0269096 | A1 | 10/2010 | Araya |
| 2010/0287530 | A1 | 11/2010 | MacLean et al. |
| 2010/0306696 | A1 | 12/2010 | Groth et al. |
| 2011/0173537 | A1 | 7/2011 | Hemphill |
| 2011/0289546 | A1 | 11/2011 | Pieczul et al. |
| 2012/0005581 | A1 | 1/2012 | Turner |
| 2012/0023442 | A1 | 1/2012 | Oshiro et al. |
| 2012/0030591 | A1 | 2/2012 | Demant et al. |
| 2012/0079379 | A1 | 3/2012 | Hathaway et al. |
| 2012/0124555 | A1 | 5/2012 | Bannoura et al. |

(56) References Cited

U.S. PATENT DOCUMENTS

| | | | |
|---|---|---|---|
| 2012/0151361 A1 | 6/2012 | Burton | |
| 2012/0167008 A1 | 6/2012 | Zaman et al. | |
| 2012/0191502 A1 | 7/2012 | Gross et al. | |
| 2012/0206498 A1* | 8/2012 | Kai | G06F 3/0482 345/684 |
| 2012/0246487 A1 | 9/2012 | Gu et al. | |
| 2012/0254723 A1 | 10/2012 | Kasa et al. | |
| 2012/0324422 A1 | 12/2012 | Chartier et al. | |
| 2012/0330668 A1 | 12/2012 | Verna et al. | |
| 2012/0331441 A1 | 12/2012 | Adamson | |
| 2013/0086508 A1 | 4/2013 | Oguz | |
| 2013/0120295 A1 | 5/2013 | Kim et al. | |
| 2013/0139056 A1 | 5/2013 | Borkowski et al. | |
| 2013/0145314 A1 | 6/2013 | Dhar et al. | |
| 2013/0191880 A1 | 7/2013 | Conlan et al. | |
| 2013/0219263 A1 | 8/2013 | Abrahami | |
| 2013/0247006 A1 | 9/2013 | Trowbridge | |
| 2013/0300758 A1 | 11/2013 | Yerli | |
| 2014/0258970 A1 | 9/2014 | Brown et al. | |
| 2014/0298253 A1 | 10/2014 | Jin et al. | |
| 2014/0366157 A1 | 12/2014 | Yancey et al. | |
| 2015/0058709 A1* | 2/2015 | Zaletel | G06F 3/14 715/202 |
| 2015/0149937 A1 | 5/2015 | Khalid et al. | |

OTHER PUBLICATIONS

"International Search Report & Written Opinion Received for PCT Patent Application No. PCT/US2014/057940", dated Jan. 12, 2015, 10 pages.
"ACC97: How to Modify Query Properties in Microsoft Access", Available at least as early as Jan. 13, 2015, Available at <<http://support.microsoft.com/kb/304451>>.
Brydon, Michael, "Access Tutorial: Parameter Queries", Published Aug. 1997, Available at <<http://fisher.osu.edu/~muhanna.1/837/MSAccess/tutorials/param.pdf>>.
International Search Report and Written opinion Issued in PCT Patent Application No. PCT/US2014/057322, dated Jan. 22, 2015, 9 Pages.
International Search Report and Written Opinion Issued in PCT Application No. PCT/US2014/057938, dated Feb. 6, 2015, 11 Pages.
International Search Report & Written Opinion for PCT Patent Application No. PCT/US2014/057321, dated Feb. 6, 2015, 8 Pages.
International Search Report and Written Opinion Issued in PCT Application No. PCT/US2014/057324, dated Jun. 24, 2015, 5 Pages.
Second Written Opinion Issued in PCT Application No. PCT/US2014/057939, dated Jun. 24, 2015, 4 Pages.
"International Preliminary Report on Patentability Issued in PCT Application No. PCT/US2014/057324", dated Aug. 5, 2015, 6 pages.
Second Written Opinion Issued in PCT Patent Application No. PCT/US2014/057321, dated Aug. 7, 2015, 6 Pages.
"W3C Technical Reports", Published Nov. 11, 1999, 8 Pages. Available at <<http://www.w3.org/Consortium/Process/Process-19991111.tr.html#RecsCR>>.
Second Written Opinion Issued in PCT Application No. PCT/US2014/057940, dated Aug. 27, 2015, 8 Pages.
W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.
"International Search Report and Written Opinion Received for PCT patent Application No. PCT/US2014/057939" dated Dec. 1, 2014, 8 pages.
"International Search Report and Written Opinion Received for PCT patent Application No. PCT/US2014/057324" dated Dec. 1, 2014, 8 pages.

"International Preliminary Report on Patentability Issued in PCT Application No. PCT/US2014/057321", dated Dec. 4, 2015, 7 Pages.
"International Preliminary Report on Patentability Issued in PCT Application No. PCT/US2014/057939", dated Dec. 4, 2015, 5 Pages.
Office Action dated Jan. 29, 2016 cited in U.S. Appl. No. 14/231,869 (Copy Attached).
Office Action dated Feb. 1, 2016 cited in U.S. Appl. No. 14/231,880 (Copy Attached).
"International Preliminary Report on Patentability Issued in PCT Application No. PCT/US2014/057938", dated Dec. 23, 2015, 8 Pages.
"International Preliminary Report on Patentability Issued in PCT Application No. PCT/US2014/057323", dated Dec. 23, 2015, 7 Pages.
"International Preliminary Report on Patentability Issued in PCT Application No. PCT/US2014/057940", dated Dec. 23, 2015, 9 Pages.
Office Action dated Feb. 16, 2016 cited in U.S. Appl. No. 14/231,883 (Copy Attached).
Office Action dated Feb. 26, 2016 cited in U.S. Appl. No. 14/231,891 (Copy Attached).
"International Preliminary Report on Patentability Issued in PCT Patent Application No. PCT/US2014/057322", dated Jan. 12, 2016, 6 Pages.
Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.
Thurrott, Paul, "Windows 8 Feature Focus: Live Tiles", Published on: Jan. 28, 2013, Available at: http://winsupersite.com/article/windows8/windows-8-feature-focus-live-tiles-144652.
"International Preliminary Report on Patentability Issued in PCT Application No. PCT/US2014/057938", dated Sep. 17, 2015, 7 Pages.
Notice of Allowance dated Jun. 20, 2016 cited in U.S. Appl. No. 14/231,891 (Copy Attached).
Office Action dated Aug. 17, 2016 cited in U.S. Appl. No. 14/231,869 (Copy Attached).
U.S. Appl. No. 14/231,883, filed May 24, 2016, Office Action.
U.S. Appl. No. 14/231,862, filed May 19, 2016, Office Action.
U.S. Appl. No. 14/231,846, filed Jun. 14, 2016, Office Action.
U.S. Appl. No. 14/231,905, filed Jun. 14, 2016, Office Action.
Notice of Allowance dated Aug. 29, 2016 cited in U.S. Appl. No. 14/231,883 (Copy Attached).
Office Action dated Sep. 23, 2016 cited in U.S. Appl. No. 14/231,846 (Copy Attached).
Office Action dated Nov. 2, 2016 cited in U.S. Appl. No. 14/231,905 (Copy Attached).
Office Action dated Nov. 17, 2016 cited in U.S. Appl. No. 14/231,912 (Copy Attached).
Office Action dated Jan. 11, 2017 cited in U.S. Appl. No. 14/231,917 (Copy Attached).
Notice of Allowance dated Feb. 13, 2017 cited in U.S. Appl. No. 14/231,869 (Copy Attached).
Office Action dated Sep. 6, 2016 cited in U.S. Appl. No. 14/231,880 (Copy Attached).
Office Action dated Sep. 9, 2016 cited in U.S. Appl. No. 14/231,873 (Copy Attached).
Office Action dated Apr. 3, 2017 cited in U.S. Appl. No. 14/231,880 (Copy Attached).
Ray, Li, France, Kim "Using UML to Visualize Role-Based Access Control Constraints" published Jun. 2004. Computer Science Dept. Colorado State University Fort Collings, CO—SACMAT'04, Yorktown Heights, New York, USA.
Notice of Allowance dated Mar. 29, 2017 cited in U.S. Appl. No. 14/231,905 (Copy Attached).
Office Action dated Feb. 21, 2017 cited in U.S. Appl. No. 14/231,862 (Copy Attached).
European Office Action issued in EPO Patent Application No. 14783733.0 dated May 22, 2017.
U.S. Appl. No. 14/231,873, dated May 17, 2017, Office Action.

(56) References Cited

OTHER PUBLICATIONS

Office Action Issued in Chile Patent Application No. 729-2016, dated May 17, 2017, 6 Pages.
U.S. Appl. No. 14/231,862, dated Jun. 14, 2017, Notice of Allowance.
U.S. Appl. No. 14/231,912, dated Jun. 16, 2017, Office Action.
U.S. Appl. No. 14/231,846, dated Jul. 12, 2017, Office Action.

* cited by examiner

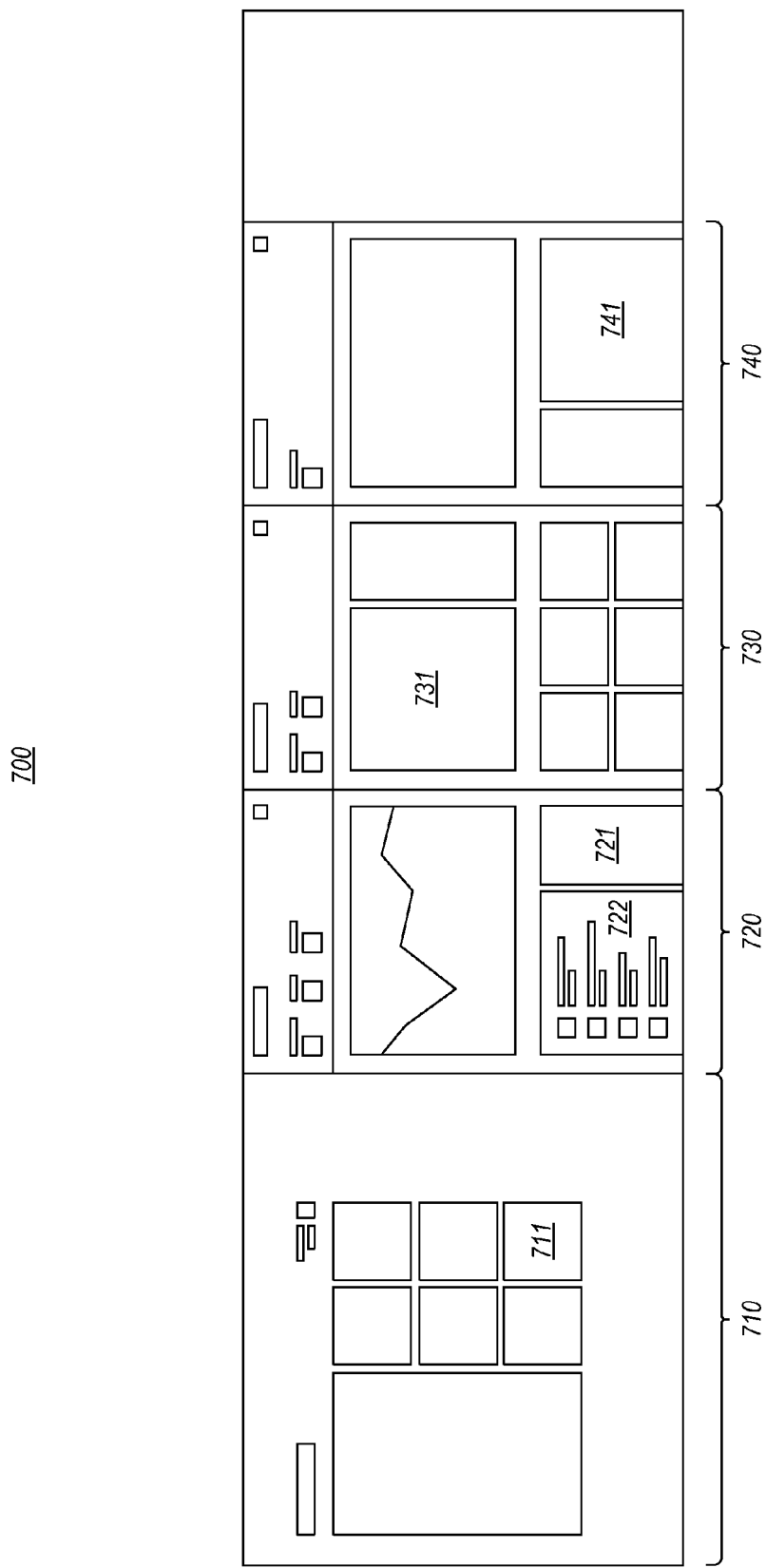

COMPOSABLE SELECTION MODEL THROUGH REUSABLE COMPONENT

CROSS-REFERENCE TO RELATED APPLICATIONS

This application claims the benefit of each of the following provisional patent applications, and each of the following provisional patent applications are incorporated herein by reference in their entirety:

1. U.S. Provisional Application Ser. No. 61/905,247, filed Nov. 17, 2013;
2. U.S. Provisional Application Ser. No. 61/884,743, filed Sep. 30, 2013;
3. U.S. Provisional Application Ser. No. 61/905,111, filed Nov. 15, 2013;
4. U.S. Provisional Application Ser. No. 61/905,243, filed Nov. 17, 2013;
5. U.S. Provisional Application Ser. No. 61/905,114, filed Nov. 15, 2013;
6. U.S. Provisional Application Ser. No. 61/905,116, filed Nov. 15, 2013;
7. U.S. Provisional Application Ser. No. 61/905,129, filed Nov. 15, 2013;
8. U.S. Provisional Application Ser. No. 61/905,105, filed Nov. 15, 2013;
9. U.S. Provisional Application Ser. No. 61/905,101, filed Nov. 15, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

A computing system user interface often has multiple user interface elements, one or more of which being selectable. The user may interact with the user interface by, amongst other things, selecting the selectable user interface elements. The selection of the user interface elements causes one or more other actions to occur.

Often, the code governing what is to happen upon selection of a user interface element is fairly customized for the user interface element itself. Furthermore, when the user interface element is selected, there is not always a visualization associated with the user interface that represents the selection state. Furthermore, some actions taken upon selection may be reversible. However, when the user reverses the action themselves, this often does not result in automatic visualization of the de-selection of the user interface element.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

At least some embodiments described herein relate to a selection component that facilitates selection of one or more user interface items. The selection component maintains selection state representing whether or not each of one or more user interface items is selected. Upon receiving a user interface item identification from a data model component, the selection component determines a selection state of the identified user interface item using the maintained selection state. The selection component then propagates the selection state in two directions. In one direction, the selection component notifies the identified user interface item of the selection state so that the user interface item may visualize its selection state. In the other direction, the selection component notifies an action module of the selection state of the user interface item so that the action module may take further action external to the user interface item based on the selection state. For instance, the action module might create a new user interface element. The selection component might also serialize the selection state so that the selection state may be more easily persisted and composed with other selection state to thereby construct a complete navigation or selection state of the user interface.

The selection component may be highly interactive. For instance, if the action module detects some action external to the user interface item (such as the removing of a user interface element that was created upon selection of the user interface item), the action module may notify the selection component. The selection component then changes its maintained selection state (and potentially also serializes the changed selection state for easy persistence), and also notifies the user interface item of the change in selection state, causing the user interface item to change its visualization in order to reflect the selection state change. If user interaction with the user interface item results in a change in selection state, the user interface item would change its visualization to reflect the change, and also notify the selection component of the change. The selection component would then change its maintained selection state (and serialize the change for persistence), and notify the action module of the change so that external action may be taken responsive to the change.

The selection component may be reusable in the sense that it may operate for any user interface item for which it maintains selection state. The same selection component may be used by the larger application with the goal of having consistent selection behavior across the application.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates a user interface that includes a canvas populated by a large number of selectable elements.

DETAILED DESCRIPTION

Figure 1:
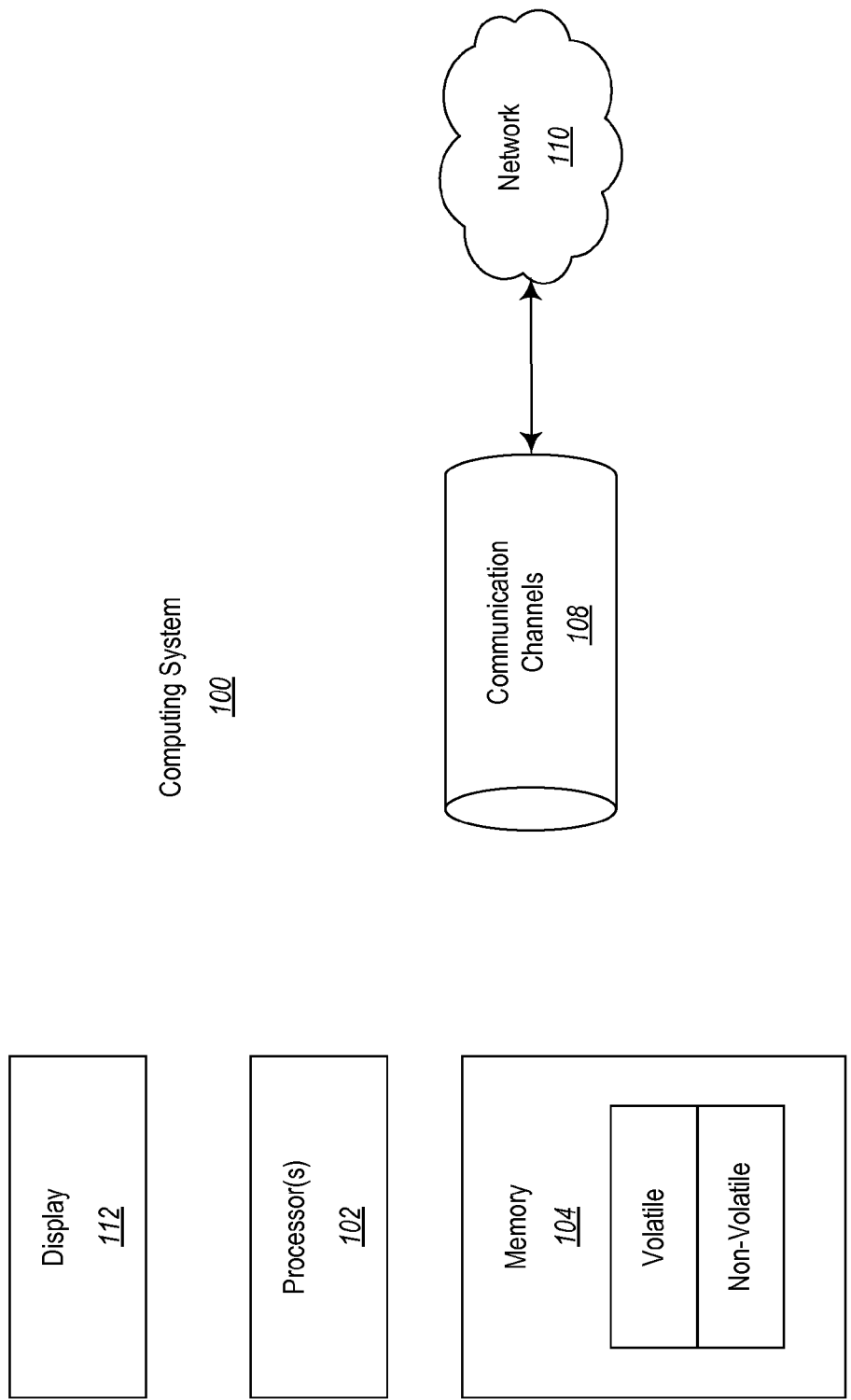
FIG. 1 abstractly illustrates an example computing system in which the principles described herein may be employed.

At least some embodiments described herein relate to a selection component that facilitates selection of one or more user interface items. The selection component maintains selection state representing whether or not each of one or more user interface items is selected. Upon receiving a user interface item identification from a data model component, the selection component determines a selection state of the identified user interface item using the maintained selection state. The selection component then propagates the selection state in two directions. In one direction, the selection component notifies the identified user interface item of the selection state so that the user interface item may visualize its selection state. In the other direction, the selection component notifies an action module of the selection state of the user interface item so that the action module may take further action external to the user interface item based on the selection state. For instance, the action module might create a new user interface element. The selection component might also serialize the selection state so that the selection state may be more easily persisted and composed with other selection state to thereby construct a complete navigation or selection state of the user interface.

The selection component may be highly interactive. For instance, if the action module detects some action external to the user interface item (such as the removing of a user interface element that was created upon selection of the user interface item), the action module may notify the selection component. The selection component then changes its maintained selection state (and potentially also serializes the changed selection state for easy persistence), and also notifies the user interface item of the change in selection state, causing the user interface item to change its visualization in order to reflect the selection state change. If user interaction with the user interface item results in a change in selection state, the user interface item would change its visualization to reflect the change, and also notify the selection component of the change. The selection component would then change its maintained selection state (and serialize the change for persistence), and notify the action module of the change so that external action may be taken responsive to the change. Serialization also ensures that selection state may be preserved across restarts of the application.

The selection component may be reusable in the sense that it may operate for any user interface item for which it maintains selection state. The same selection component may user by the larger application with the goal of having consistent selection behavior across the application.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
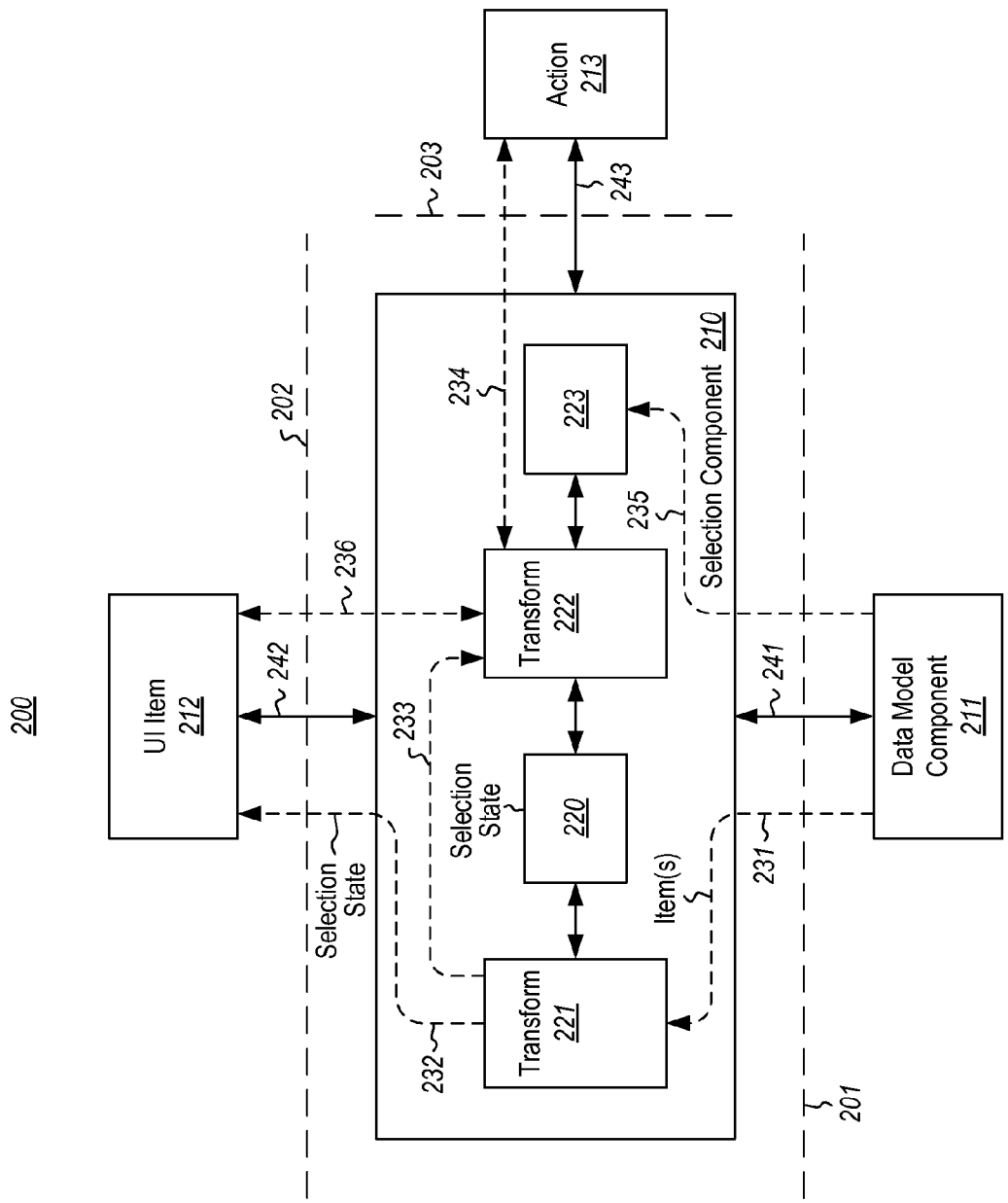
FIG. 2 abstractly illustrates a selection environment in which a selection component interfaces with a data model component, a user interface item, and an action module, each over respective application program interfaces.

FIG. 2 illustrates a selection environment 200 that includes a selection component 210. The selection component 210 has three different interfaces of communication. In particular, the selection component 210 communicates (as represented by arrow 241) with a data model component 211 over an interface 201, communicates (as represented by arrow 242) with a user interface item 212 over an interface 202, and communicates (as represented by arrow 243) with an action module 213 over an interface. This allows the selection component 210 to be reusable for any data model component, for any user interface item, and for any action module. This allows various contribution from many different authors of such components as long as they comply with the interface 201 (for data model component authors), the interface 202 (for user interface item authors), and the interface 203 (for action module authors).

When a user interface item is created on the user interface, a selection component is instantiated for that user interface item. Furthermore, the selection component is also associated with a data model component that projects data into the user interface item. For instance, when creating the user interface item 212, the data model component 211 that populates the user interface item 212 is likewise created, and a selection component 210 is established to mediate selection activity for the user interface item.

If the user interface item 212 is created from persisted state from previous operation of the user interface element 212, then the selection state may be retrieved and used to populate selection state 220 maintained within the selection component 210. Otherwise, the selection state 220 may be loaded with a default selection state (e.g., not selected).

Figure 3:
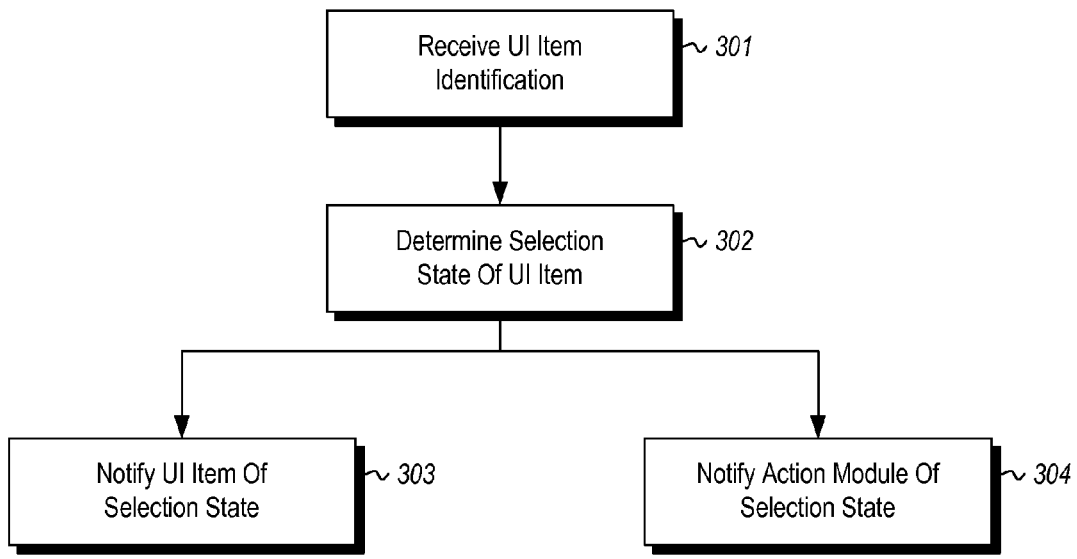
FIG. 3 illustrates a flowchart of a method for setting a selection state of a user interface item.

FIG. 3 illustrates a flowchart of a method for setting a selection state of a user interface item. For instance, in the case of FIG. 2, the selection component 210 sets the selection state of the user interface item 212 and maintains that selection state within maintained selection state 220. For instance, the method 300 may be performed this would be done when a given user interface item is restored into the larger application user interface state (such as when the application restarts or when the user interacts with the user interface in a manner that puts a given user interface item back on the screen.

The selection component first receives a user interface identification item (act 301). For instance, the data model component 211 identifies the user interface item 212 to the selection component 210. In the implementation, the data model component identifies the user interface item to the transform 221 as represented by dashed arrow 231.

The selection component then determines a selection state of the identified user interface item using the maintained selection state (act 302). For instance, in FIG. 2, the transform 221 identifies the user interface item 212 as selectable, and also identifies the corresponding selection state of the user interface item 212 using the maintained selection state 222. For instance, the user interface item might have two selection modes; namely, selected and unselected.

In response to this determination (act 302), the selection component then notifies the user interface of the selection state so that the user interface item may visualize its selection state (act 303). In FIG. 2, for example, the transform 221 communicates (as represented by dashed arrow 232) the selection state of the user interface item 212 to the user interface item 212. The user interface item would then visualize its selection state (whether selected or unselected).

In addition, the selection component notifies an action module of the selection state of the user interface item (act 304) so that the action module may take further action external to the user interface item based on the selection state. For instance, in FIG. 2, the transform 221 provides the selection state to the transform 222 (as represented by arrow 233). The transform 222 determines whether a selection state is a selected mode of the selection state, and for those situations in which the selection state is the selected mode, notifies (as represented by dashed arrow 234) an appropriate action module 213 that the user interface item 212 is selected. The appropriate action module then may take further action external to the user interface element. For instance, the action module 213 might create a new user interface element. However, there may be situations in which an unselected mode of the selection state might also cause some action to occur. Accordingly, the action module 213 might be notified regardless of whether the user interface item is selected or unselected.

The action to be taken when a user interface element is selected may be dynamic and/or vary based on conditions. The data model component 211 itself might determine whether or not those conditions are met, and also what action is appropriate under the circumstances. The data model component 211 might then notify (as represented by dashed arrow 235) the action determination module 234 of the appropriate action. The selection component 210 would then use the action determination module 223 to identify the appropriate action and the appropriate action module 213 to notify. Alternatively, the action determination module 223 may have an understanding of the conditions whereby different actions are taken without that input from the data model component 211. In addition, though not illustrated, the selection state may be serialized at this point so that the selection state may be persisted.

The selection component 210 is highly responsive to changes in the initial selection state, where changes may come in a variety of manners. For instance, the action module itself may detect that certain actions taken outside of the user interface item warrant a change in the selection state of the user interface item. Alternatively, user interaction with the user interface item may likewise cause a change in selection state of the user interface item. The selection component 210 is responsive to either of these events, and changes and propagates selection state accordingly.

Figure 4:
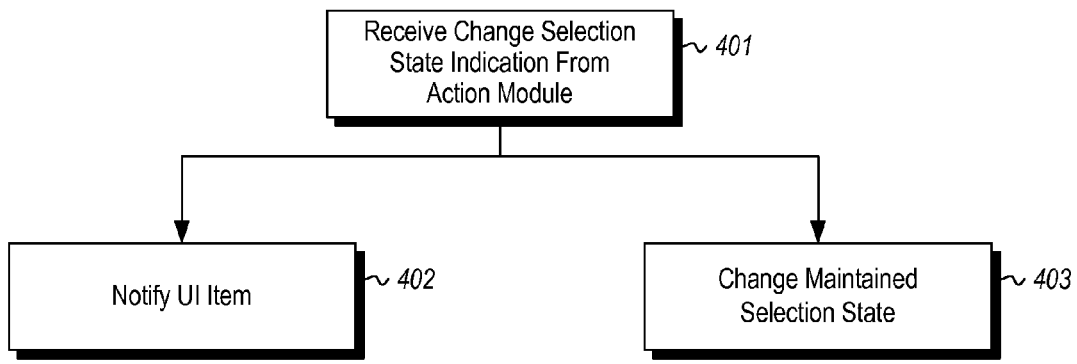
FIG. 4 illustrates a flowchart of a method for responding to indications of selection state change from outside of the user interface item.

For instance, FIG. 4 illustrates a flowchart of a method 400 for responding to indications of selection state change from outside of the user interface item. The action module 213 signals the selection component 210 indicating that an action external to the user interface item has been taken to change the selection state of the user interface item from a first selection mode (one or the selected or unselected modes) to a second selection mode (the other of the selected or unselected modes) (act 401). For instance, suppose that selection of the user interface item results in a new user interface element being opened. When the new user interface element is subsequently closed by the user, this might trigger the selection state of the original user interface item back to an unselected mode.

In response to the received indication from the action module (act 401), the selection component notifies the user interface of the switch of the selection state (act 402) so that the user interface item may visualize the selection state as being the second selection mode. For instance, if the external action indicates that the user interface item is to become unselected, the user interface item is visualized to be unselected. If the external action indicates that the user interface item is to become selected, the user interface item is visualized to be selected. In FIG. 2, the action module would notify (as represented by dashed arrow 234) the transform 222 of the change in selection status, and the transform 222 would then notify (as represented by dashed arrow 236) the user interface item 212 of the change in selection state.

Also in response to the received indication of changed selection state from the action module, the selection component updates the maintained selection state of the user interface item (act 403). For instance, in FIG. 2, the transform 222 may change the maintained selection state 220 of the user interface item 212. In addition, though not illustrated, the changed selection state may be serialized at this point so that the selection state may be persisted.

Figure 5:
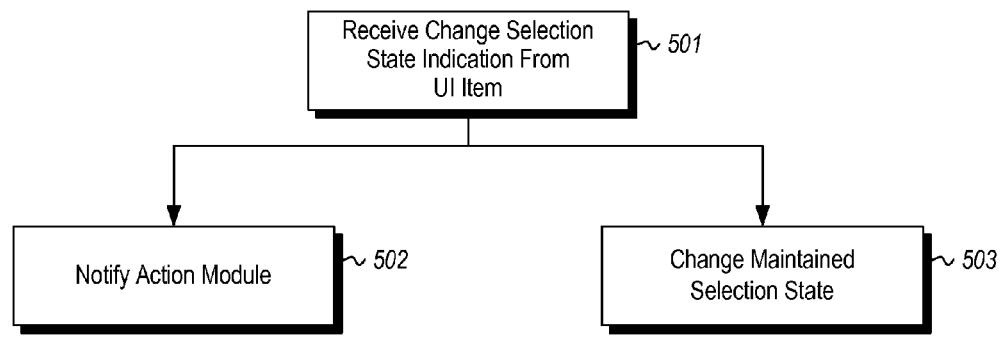
FIG. 5 illustrates a flowchart of a method for responding to indications of selection state change from the user interface item.

FIG. 5 illustrates a flowchart of a method 500 for responding to indications of selection state change from the user interface item. The user interface item signals the selection component 210 indicating that interaction has occurred with the user interface item so as to change the selection state of the user interface item between selection modes (act 501). For instance, a user might have clicked on the user interface item causing the user interface item to be selected, if previously unselected, or causing the user interface item to be unselected, if previously selected. In FIG. 2, for example, the user might have selected or unselected user interface item 212, which then signals the change in selection state to the selection component 210. Correspondingly, the user interface item signals (as represented by the arrow 236) the transform 222 of the selection component 210.

In response to the received indication from the user interface item (act 501), the selection component identifies to the action module of the switch in selection state (act 502) so that the action module may take appropriate action external to the user interface item. For instance, if the user selects the user interface item, then the external action might be to create a new user interface element. If the user unselects the user interface item, then the external action might be to remove that new user interface element. In FIG. 2, the transform 222 would notify (as represented by dashed arrow 234) the action module 213 of the change in selection status.

Also in response to the received indication of changed selection state from the user interface item 212, the selection component updates the maintained selection state of the user interface item (act 503). For instance, in FIG. 2, the transform 222 may change the maintained selection state 220 of the user interface item 212. In addition, though not illustrated, the changed selection state may be serialized at this point so that the selection state may be persisted.

The method 400 may be performed any number of times each time the action module indicates a change in selection status of the user interface item. Likewise, the method 500 may be performed any number of times each time the user interface item indicates a change in selection status of the user interface item. The methods 400 and 500 may be performed in any order, regardless of whether the change is from selected mode to unselected mode, or vice versa, from unselected mode to selected mode.

Up to this point, the user interface element is described as interfacing with but a single user interface item. The data model component may be capable of projecting into any number of user interface items.

For instance, if the data model component 211 corresponded to a single user interface item, the data model component 211 would identify just a single user interface item to the selection component 210. This may be thought of as a button module, in which the user interface item may be thought of as a button selected as a whole.

In other cases, however, the data model component 211 might correspond to multiple user interface items, such as a list, or a component that has selectable regions (or hotspots). In that case, the data model component 211 might provide an identification of multiple user interface items to the transform 221 (as represented by dashed arrow 231). The transform 221 would then provide a list of all of the selectable user interface items and their corresponding selection state to the container user interface element (represented by arrow 232) (e.g., the list, or element that includes hotspots) so that the selection status may be visualized. Likewise, the transform 222 would provide a list of all of the selected user interface items to the action module (represented by arrow 234). For instance, if there were two selected user interface items in the container element, the action module 213 might create two new user interface elements, one for each selected user interface item. The interaction described by FIGS. 4 and 5 are applicable in any order appropriate given the order of interaction of the user between the user interface item and other interaction that causes a change in selection state. Likewise, FIGS. 4 and 5 apply to any of the corresponding user interface items.

Figure 6:
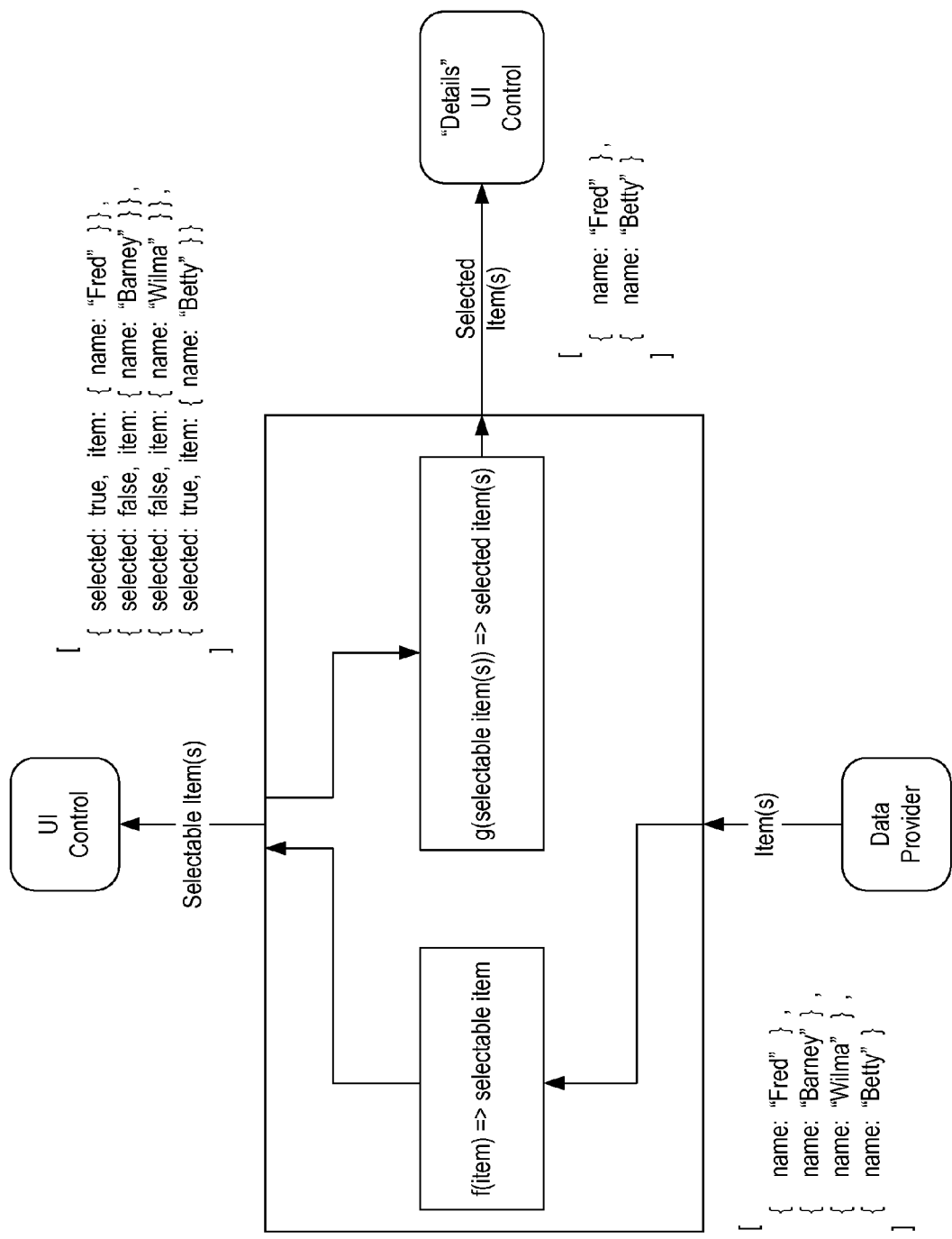
FIG. 6 illustrates an example implementation applied to an example in which the data model component in the form of a data provider is associated with a list that includes four members, each having a corresponding user interface item.

FIG. 6 illustrates an example implementation applied to an example in which the data model component (the "data provider" in FIG. 6) is associated with a list that includes four members, each having a corresponding user interface item. The data provider provides the four identifiers for the four user interface elements to a transform (f) that converts the identifier list into a list of those identifiers that correspond to selectable user interface items (i.e., a selectable list), and indicates a selection state of each of the items that are selectable. In this case, all four of the identifiers are for user interface items that are selectable, and two of the identifiers are marked as selected, and two are identified as unselected. The selectable list is then provided to the transform (g), which reduces the selectable list to a selected list for providing to an action that generates a details user interface element for each selected user interface item. The transform "g" is reversible to allow interaction with the details user interface elements and the user interface items to thereby propagate selection state. Although the principles described herein have been described with respect to selectable lists, the same principles may also apply to tree structures in which the elements are nodes of the tree.

Accordingly, a reusable selection component is described that propagates selection state to and from the action module, such that changes is selection state are propagated efficiently upstream and downstream of navigation. Furthermore, the selection component is reusable because functions performed therein are common regardless of the user interface element, the data source, or the action being taken based on the selection state.

A particular example of how the selection component may be used in a larger context will now be described. FIG. 7 illustrates a user interface 700 that includes a canvas populated by a large number of selectable elements. Only a few of the selectable elements are labeled as they are more relevant for the discussion herein.

In the context of FIG. 7, the user interface is a canvas that is horizontally extendable rightward as the user engages with the canvas. The canvas might have originally included only a favorites area 710 that includes multiple selectable parts, including part 711. When the user selects part 711, a blade 720 appears. A blade is a user interface component that occupies a position range along the extendable direction of the canvas, and occupies substantially all of the orthogonal range of the canvas at that location. When the user selects part 711, an associated selectable component may be notified by the user interface item 711. The associated selectable component then notifies the action module, which in this case, causes blade 720 to appear. The selected mode of the user interface item 711 would be emphasized in some manner.

The blade 720 includes multiple selectable elements (e.g., parts), some of which perhaps being grouped into lenses. For instance, the blade 720 includes part 721 and 722, amongst other parts. The parts 721 and 722 are combined into a lens such that they are moved as a unit together. When the part 721 is selected, a further blade 730 appears, which further includes selectable elements such as the part 731. For instance, again, when the user selects part 721, yet another associated selectable component may be notified by the user interface item 721. The associated selectable component then notifies an action module, which in this case, causes blade 730 to appear. The selected mode of the user interface item 721 would be emphasized in some manner.

When the part 431 is selected, a further blade 440 appears, which further includes selectable elements such as part 441. When the user selects part 731, an associated selectable component may be notified by the user interface item 731. The associated selectable component then notifies the action module, which in this case, causes blade 740 to appear. The selected mode of the user interface item 731 would be emphasized in some manner.

This may continue to allow the user to engage in a custom journey building up a canvas of history showing the path taken to get to where the user is presently. Furthermore, the user may remove blades from the journey by closing a blade, this in turn causes the selectable component to notify the corresponding user interface item to visualize a deselected mode. For instance, upon closing blade 740, the user interface item 731 will change its visual emphasis to show that the item is not selected. Upon closing blade 730, the user interface item 721 will change its visual emphasis to show that the item is not selected. Upon closing blade 720, the user interface item 711 will change its visual emphasis to show that the item is not selected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a reusable selection component of a computing system to facilitate custom actions resulting from the selection of one or more selectable user interface items on a blade on an extendable canvas, the method comprising:
   an extendable canvas that extends in an extendable direction on a user interface;
   a reusable selection component including at least a first communication interface defining at least one data model compliance rule, a second communication interface defining at least one user interface compliance rule, and a third communication interface defining at least one action module compliance rule, wherein the interfaces are configured to transmit data between the reusable selection component according to at least one compliance rule associated with a corresponding communication interface;
   displaying, on the extendable canvas, a first blade that includes one or more selectable user interface items and one or more custom actions associated with one or more of the selectable user interface items, wherein the first blade is a user interface component that occupies a position along the extendable direction of the canvas and substantially all of the orthogonal range of the canvas at that particular position;

maintaining, at the reusable selection component, a selection state representing whether or not each of one or more selectable user interface items of the first blade is selected;

determining, at the reusable selection component, a selection state of a particular selectable user interface item of the first blade using the maintained selection state, wherein the particular selectable user interface item is associated one of the one more of the custom actions;

the reusable selection component notifying, over the second communication interface, the user interface item component of the selection state of the particular selectable user interface item such that the user interface item may visualize its selection state, wherein the selection state notification is compliant with the at least one interface compliance rule; and the reusable selection component notifying, over the third communication interface, an action module of the selection state of the particular selectable user interface item, wherein the custom action module is configured to take further action external to the first blade of the extendable canvas according to the custom action associated with the particular selectable user interface item, wherein the custom action includes at least causing a second blade to appear on the extendable canvas, wherein the second blade is a user interface component that occupies a position along the extendable direction of the canvas, does not overlap with the first blade, and that occupies substantially all of the orthogonal range of the canvas at that particular position, and further wherein the second blade includes one or more new selectable user interface items capable of interacting with the reusable selection component, the data model component, and the action module.

2. The method in accordance with claim 1, further comprising:

receiving an indication from the action module that an action external to the user interface item has been taken to change the selection state of the user interface item from a first selection mode to a second selection mode;

in response to the received indication from the action module, notifying the user interface item of a switch of the selection state of the user interface item from the first selection mode to the second selection mode so that the user interface item may visualize the selection state as being the second selection mode; and in response to the received indication from the action module, updating the selection state of the user interface item as maintained by the reusable selection component to the second selection mode.

3. The method in accordance with claim 2, further comprising:

receiving an indication from the user interface item that interaction has occurred with the user interface item so as to change the selection state of the user interface item from the second selection mode to the first selection mode; and in response to the received indication from the user interface item, notifying the action module that the selection state of the user interface item has changed to the first selection mode; and in response to the received indication from the user interface item, updated the selection state of the user interface item as maintained by the reusable selection component to the first selection mode.

4. The method in accordance with claim 2, further comprising receiving a second indication from the action module that an action external to the user interface item has been taken to change the selection state of the user interface item from the second selection mode to the first selection mode;

in response to the received second indication from the action module, notifying the user interface item of a switch of the selection state of the user interface item from the second selection mode to the first selection mode so that the user interface item may visualize the selection state as being the first selection mode; and in response to the received second indication from the action module, updating the selection state of the user interface item as maintained by the reusable selection component to the first selection mode.

5. The method in accordance with claim 1, the first selection mode being a deselected state, and the second selection mode being a selected state.

6. The method in accordance with claim 1, the first selection mode being a selected state, and the second selection mode being a deselected state.

7. The method in accordance with claim 1, further comprising:

receiving an indication from the user interface item that interaction has occurred with the user interface item so as to change the selection state of the user interface item from the first selection mode to the second selection mode;

in response to the received indication from the user interface item, notifying the action module that the selection state of the user interface item has changed to the second selection mode; and in response to the received indication from the user interface item, updating the selection state of the user interface item as maintained by the reusable selection component to the second selection mode.

8. The method in accordance with claim 7, further comprising:

receiving an indication from the action module that an action external to the user interface item has been taken to change the selection state of the user interface item from the second selection mode to the first selection mode;

in response to the received indication from the action module, notifying the user interface item of a switch of the selection state of the user interface item from the second selection mode to the first selection mode so that the user interface item may visualize the selection state as being the first selection mode; and in response to the received indication from the action module, updating the selection state of the user interface item as maintained by the reusable selection component to the first selection mode.

9. The method in accordance with claim 7, further comprising:

receiving a second indication from the user interface item that interaction has occurred with the user interface item so as to change the selection state of the user interface item from the second selection mode to the first selection mode;

in response to the received second indication from the user interface item, notifying the action module that the selection state of the user interface item has changed to the first selection mode; and in response to the received second indication from the user interface item, updating the selection state of the user interface item as maintained by the reusable selection component to the first selection mode.

10. The method in accordance with claim 7, the first selection mode being a deselected state, and the second selection mode being a selected state.

11. The method in accordance with claim 7, the first selection mode being a selected state, and the second selection mode being a deselected state.

12. The method in accordance with claim 1, the user interface item being a first user interface item, the action module being a first action module, the selection state of the first user interface item being first selection state, the method further comprising:

receiving a second user interface item identification;

determining a second selection state of the identified second user interface item using the maintained selection state;

notifying the second user interface item of the second selection state so that the second user interface item may visualize the second selection state; and notifying a second action module of the second selection state of the second user interface item so that the second action module may take further action external to the second user interface item based on the second selection state.

13. The method in accordance with claim 12,
receiving the first user interface identification, and the act of receiving the second user interface identification are performed by receiving a single message that includes both the first user interface identification and the second user interface identification.

14. The method in accordance with claim 1, the further action external to the user interface item being a creation of a new user interface item.

15. The method in accordance with claim 1, the user interface item being a button element.

16. The method in accordance with claim 1, the user interface item being a member of a list.

17. The method in accordance with claim 1, the user interface item being a region visualized in another user interface element.

18. The method in accordance with claim 1, wherein the action performed by the action component depends on one or more conditions determined by at least one of the reusable selection component and the data component that provides the user interface item identification to the reusable selection component.

19. A computer program product comprising one or more computer-readable storage media having computer-executable instructions thereon that, when executed by one or more processors of a computing system, cause the computing system to perform a method of facilitating custom actions resulting from the selection of one or more selectable user interface items on a blade on an extendable canvas, the method comprising:

an extendable canvas that extends in an extendable direction on a user interface;

a reusable selection component including at least a first communication interface defining at least one data model compliance rule, a second communication interface defining at least one user interface compliance rule, and a third communication interface defining at least one action module compliance rule, wherein the interfaces are configured to transmit data between a reusable selection component according to at least one compliance rule associated with a corresponding communication interface;

displaying, on the extendable canvas, a first blade that includes one or more selectable user interface items and one or more custom actions associated with one or more of the selectable user interface items, wherein the first blade is a user interface component that occupies a position along the extendable direction of the canvas and substantially all of the orthogonal range of the canvas at that particular position;

maintaining selection state at the reusable selection component representing whether or not each of a plurality of selectable user interface items of the first blade are selected;

the reusable selection component determining a selection state of a particular user interface item of the first blade using the maintained selection state, wherein the particular selectable user interface item is associated one of the one more of the custom actions;

the reusable selection component notifying, over the second communication interface, the user interface item component of the selection state of the particular selectable user interface item such that the user interface item may visualize its selection state, wherein the selection state notification is compliant with the at least one interface compliance rule; and the reusable selection component notifying, over the third communication interface, an action module of the selection state of the particular selectable user interface item, wherein the custom action module is configured to take further action external to the first blade of the extendable canvas according to the custom action associated with the particular selectable user interface item, wherein the custom action includes at least causing a second blade to appear on the extendable canvas, wherein the second blade is a user interface component that occupies a position along the extendable direction of the canvas, does not overlap with the first blade, and that occupies substantially all of the orthogonal range of the canvas at that particular position, and further wherein the second blade includes one or more new selectable user interface items capable of interacting with the reusable selection component, the data model component, and the action module.

20. A computer system, comprising
one or more processors; and
one or more computer readable storage media having stored thereon computer-executable instructions that are executable by the one or more processors to cause the computer system to instantiate a reusable selection component to facilitate custom actions resulting from the selection of one or more selectable user interface items on a blade on an extendable canvas, the computer executable instructions including instructions that are executable to cause the computer system to perform at least the following:

display, and a display device, an extendable canvas that extends in an extendable direction on a user interface;

instantiate a reusable selection component including at least a first communication interface defining at least one data model compliance rule, a second communication interface defining at least one user interface compliance rule, and a third communication interface defining at least one action module compliance rule, wherein the interfaces are configured to transmit data between the reusable selection component according to at least one compliance rule associated with a corresponding communication interface;

display, on the extendable canvas, a first blade that includes one or more selectable user interface items and one or more custom actions associated with one or more of the selectable user interface items, wherein the first blade is a user interface component that occupies a position along the extendable direction of the canvas and substantially all of the orthogonal range of the canvas at that particular position;

maintain, at the reusable selection component, a selection state representing whether or not each of a plurality of selectable user interface items of the first blade are selected;

determine, at the reusable selection component, a selection state of a particular selectable user interface item of the first blade using the maintained selection state, wherein the particular selectable user interface item is associated one of the one more of the custom actions;

notify, at the reusable selection component, over the second communication interface the user interface item component of the selection state of the particular selectable user interface item such that the user interface item may visualize its selection state, wherein the selection state notification is compliant with the at least one interface compliance rule; and notify, at the reusable selection component, over the third communication interface, an action module of the selection state of the particular selectable user interface item, wherein the custom action module is configured to take further action external to the first blade of the extendable canvas according to the custom action associated with the particular selectable user interface item, wherein the custom action includes at least causing a second blade to appear on the extendable canvas, wherein the second blade is a user interface component that occupies a position along the extendable direction of the canvas, does not overlap with the first blade, and that occupies substantially all of the orthogonal range of the canvas at that particular position, and further wherein the second blade includes one or more new selectable user interface items capable of interacting with the reusable selection component, the data model component, and the action module.

* * * * *